United States Patent [19]

Hohenstein

[11] Patent Number: 4,574,735
[45] Date of Patent: Mar. 11, 1986

[54] ELECTRONIC LITTER SYSTEM

[76] Inventor: Donald G. Hohenstein, 1901 Westside Dr., Rochester, N.Y. 14624

[21] Appl. No.: 586,032

[22] Filed: Mar. 5, 1984

[51] Int. Cl.[4] ............................................. A01K 29/00
[52] U.S. Cl. ....................................... 119/1; 209/616
[58] Field of Search .............................. 119/1; 209/616

[56] References Cited

U.S. PATENT DOCUMENTS

| | | | |
|---|---|---|---|
| 3,021,819 | 2/1962 | Krahn | 119/22 |
| 3,482,546 | 12/1969 | Anderson | 119/1 |
| 3,871,331 | 3/1975 | Breau | 119/1 |
| 4,043,901 | 8/1977 | Gauld | 209/10 |
| 4,050,414 | 9/1977 | Knochel et al. | 119/1 |
| 4,067,297 | 1/1978 | Johnson | 119/28 X |

Primary Examiner—Robert P. Swiatek
Attorney, Agent, or Firm—Cumpston & Shaw

[57] ABSTRACT

Apparatus for receiving and disposing of animal wastes and particularly the bodily wastes of cats, include an upper chamber adapted to hold a supply of preferably nonabsorbant litter material, a rake assembly for separating waste products from the litter material, a removable container for receiving the wastes and automatic control apparatus for energizing the rake and tumbling the container at an appropriate time after the departure of the animal.

9 Claims, 5 Drawing Figures

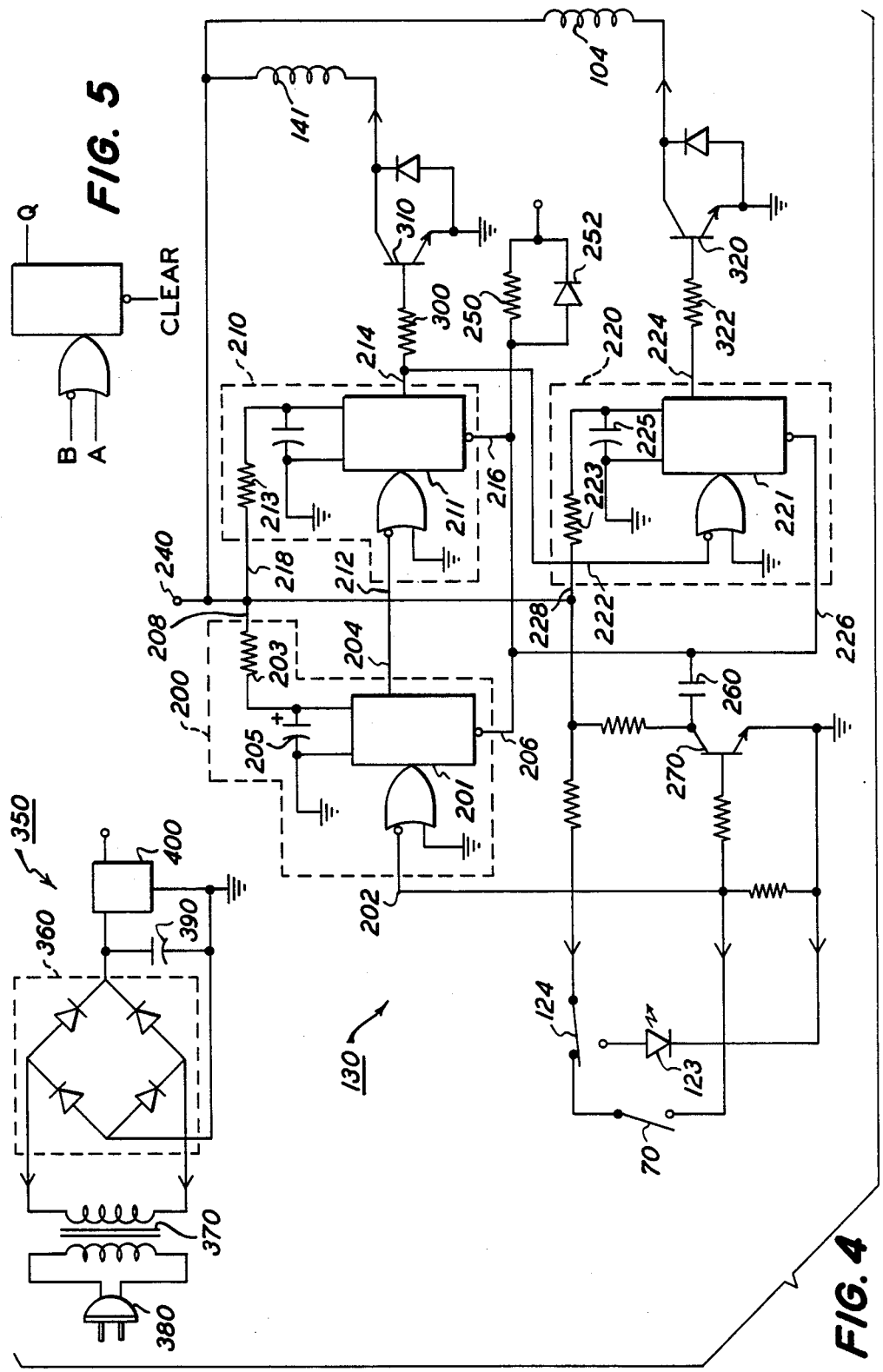

ELECTRONIC LITTER SYSTEM

This invention relates in general to apparatus for the disposition of animal excreta and more particularly to apparatus for automatically receiving an disposing of the bodily wastes of domestic cats in a clean, sanitary way.

A number of improvements on the conventional litter box have been proposed in the past. All of these have been complicated and/or ineffective for a variety of reasons. Among prior art patents relating to the subject matter hereof is U.S. Pat. No. 3,621,817 that shows an animal dumping litter box having a two-layer construction including a supply of absorbent litter, the animal waste falling from an upper bin to a lower bin along with some portion of the supply of litter, the lower bin being adapted to mix the waste with a second supply of litter for subsequent disposal.

U.S. Pat. Nos. 3,734,057; 3,747,563; 3,771,491; 3,793,988; and 4,011,836 all show various forms of animal toilets employing the cleaning action of a stream of water to remove waste products. While the devices shown in these patents may be more or less effective, the use of water for cleaning requires that a source of and means for disposing of relatively large quantities of water be provided, thereby greatly restricting the use of such devices.

U.S. Pat. No. 4,096,827 discloses a litter box having an upper and a lower chamber separated by a screen, all assembled in a hinged structure. Litter passes through the screen while waste does not so that the litter can be reused while the waste is disposed of. The device shown in the patent does not deal with the disposal of liquid waste nor may it be characterized as automatic since constant attention is involved in continually flipping the device from one side to the other and removing the waste therefrom.

U.S. Pat. No. 4,011,837 relates to a kennel structure including automatic feeding and waste disposal apparatus that includes a belt of paper on which waste is deposited and which is then wound onto a roll for disposal. The apparatus shown in the patent would not be particularly useful for cats. Cats require litter or the like in which they can scratch and bury their waste. Further, the structure shown in the patent is not suitable for small portable apparatus for use in the home.

None of the prior art shows a mechanism suitable for automatically eliminating the bodily waste of cats that can be used in the home without the need for special installation.

Accordingly, it is an object of this invention to provide apparatus in the nature of an electronic litter system for receiving the excreta of cats or other small animals in a nonabsortive medium; separating the waste from the medium; and treating the waste in a disposable cartridge.

It is another object of this invention to provide such a litter system that requires essentially no attention during normal operation except for the periodic removal and replacement of the cartridge. It is another object of this invention to extend the interval between litter changes.

It is still another object of this invention to provide an electronic litter system that requires no special training of the animal nor any long acclimation period during which the animal becomes accustomed to the system.

Briefly stated and in accordance with a presently preferred embodiment of the invention, an electronic litter system includes a generally hemispherical upper chamber holding a quantity of preferably nonabsorbant litter material; a rotatable rake assembly disposed in said chamber and adapted to pass through said litter to separate waste from the litter and carry the waste out of the upper chamber; a cartridge into which the waste is ejected, the cartridge including material for sanitizing and deodorizing the waste; and a detector for measuring the level of waste in the cartridge and for indicating the need to replace the cartridge when the same is full; and a controller for sensing the presence of an animal in the upper chamber; delaying a preselected time after the animal has exited the chamber and thereafter commencing sequenced rotation of the rake and tumbling of the cartridge for renewal and treatment of the waste.

While the novel elements of the invention are set forth with particularity in the accompanying claims, the invention itself, together with further objects and advantages thereof, will be more fully understood with reference to the following detailed description of the invention together with the accompanying drawing in which:

FIGS. 4 and 5 are schematic diagrams of an exemplary control system in accordance with the invention.

Figure 1:
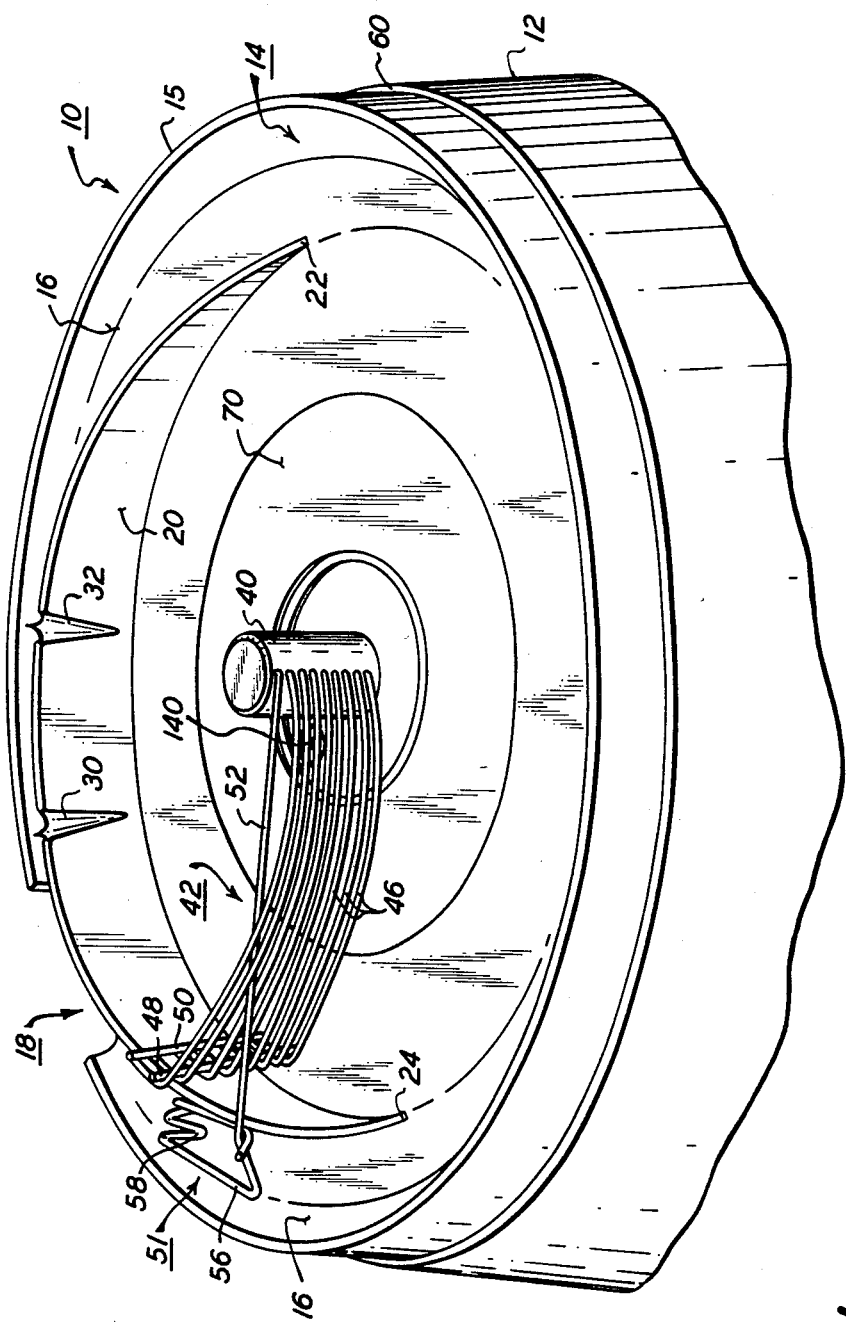
FIG. 1 is a partial perspective view of an electronic litter system in accordance with the invention showing the hemispherical bowl-shaped upper chamber thereof along with the rake structure located therein.

Referring now to FIG. 1, the upper body portion of an electronic litter system 10 is illustrated. A housing 12 includes a generally upwardly facing chamber 14 surrounded by an outer wall 15. A peripheral groove 16 surrounds approximately one half of chamber 14. Chamber 14 includes an outlet 18 in outer wall 15 at approximately the mid point of groove 16. Groove 16 is bounded by an inner wall 20 that separates groove 16 from the major central portion of chamber 14. Inner wall 20 decreases in height at its ends 22 and 24 and has a maximum height substantially opposite outlet 18. A pair of openings 30 and 32 in inner wall 20 provide for communication between groove 16 and the major portion of chamber 14 as will be more thoroughly described below.

A rotatable rake assembly is adapted to sweep through chamber 14 to separate waste products from litter (not shown). A centrally disposed rotatable spindle 40 carries a rake 42 including a plurality of prongs 46 joined at the distal end thereof by first and second vertically disposed bars 48 and 50. Preferably, prongs 46 are spaced apart a distance sufficient to allow a preferably nonabsorbant granular litter material to pass therebetween while capturing and moving animal excreta upward and outward through the litter material into groove 16 and out opening 18. Preferably, rake 42 includes a curved inner portion extending from spindle 40 to first bar 48. The outer portion of rake 42, between bars 48 and 50, is bent back to form a portion preferably parallel to outer wall 15 for movement into groove 16 by second rake 51. While the use of nonabsorbant litter material is preferred in accordance with this invention, conventional absorbant litter or a mixture of absorbant and nonabsorbant litter maybe used.

Second rake 51 is mounted at the end of elongated resilient arm 52 attached at the other end thereof to hub 40. Rake 51 has a sidewall engaging portion 56 substantially conforming to the inner circumferential wall of groove 16 and a bottom engaging portion 58 adapted to ride within groove 16. Preferably, rake 51 is shaped to trap waste and guide it to opening 18. To this end, arm 52 is flexible and twistable so as to ride in groove 14 and to eject the waste when it reaches opening 18. During operation, rake 51 will move backwards and be positioned radially behind rake 42 so that waste pushed outward by rake 42 will be captured by rake 51 on the same or a subsequent revolution of spindle 40. In operation, waste is swept outwardly by rake 42, and positioned adjacent outer wall 15. Rake 51 engages the waste and moves it into groove 16 whereupon it is confined therein by inner wall 20 until it reaches opening 18, at which point it is ejected into the disposable container as will be more fully described hereinbelow.

Openings 30 and 32 are sized and positioned to allow excess particulate litter that is carried by rake 51 to pass therethrough and be returned to the major central portion of chamber 14 while waste material is confined within groove 16 and ejected through opening 18.

Preferably, in operation, rake 42 is rotated through chamber 14 at a relatively slow speed, such as from 2–10 RPM, during a predetermined time period after the animal has left. Waste present in the litter material is swept outwardly and upwardly by rake 42 and is thereafter engaged by rake 51 and propelled out of the groove through opening 18.

Figure 2:
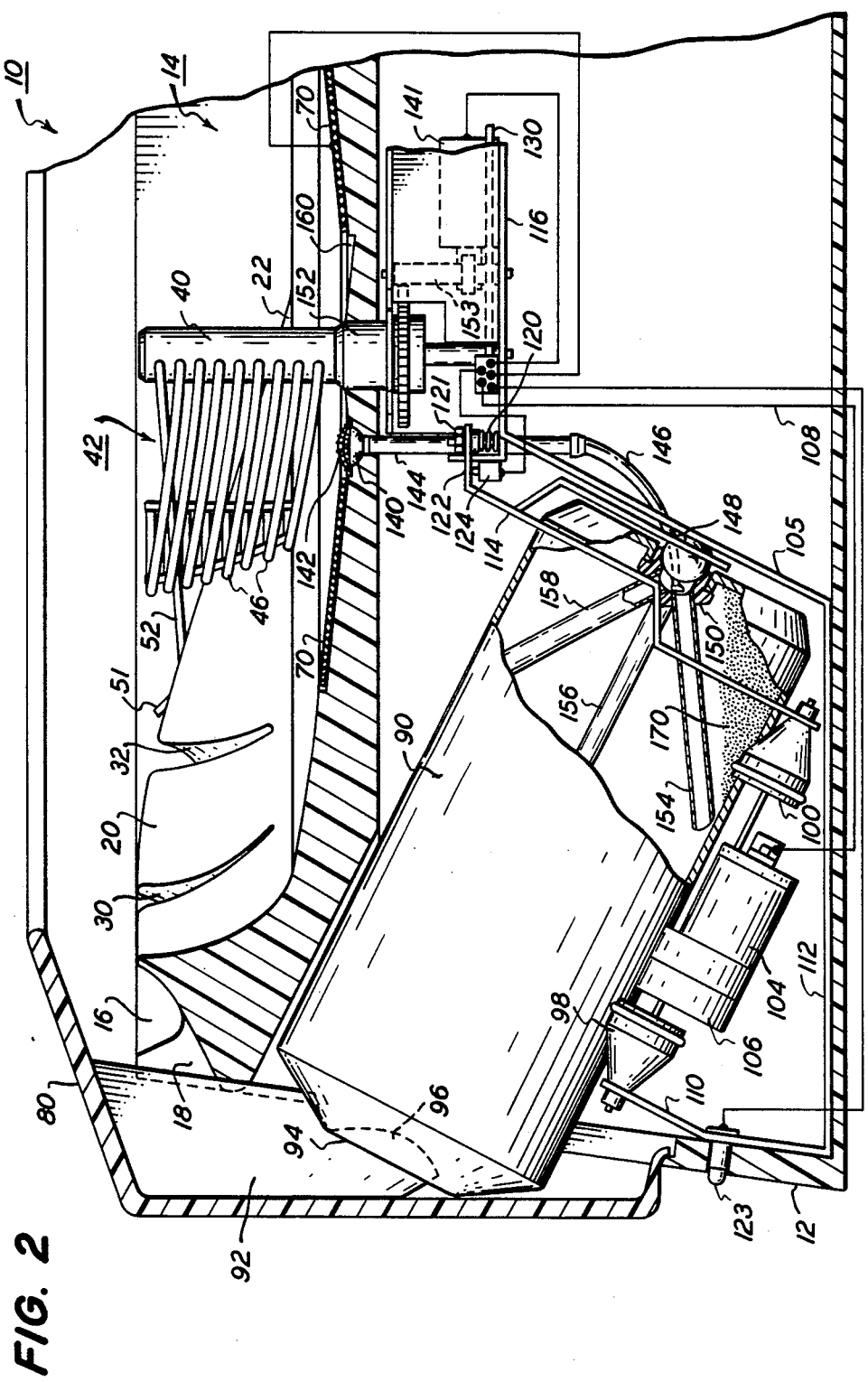
FIG. 2 is a section view of an electronic litter system in accordance with this invention.

Housing 12 includes a circumferential shoulder 60 on which a cover 80 is supported, as is more clearly seen in FIG. 2.

A substantially washer-shaped membrane switch 70 or the equivalent is disposed in a recess in the bottom of chamber 14. Membrane switch 70 is responsive to the weight of an animal entering chamber 14 to actuate the control circuitry of the electronic litter system as will be more fully described hereinbelow.

Referring now to FIG. 2, the interior portion of electronic litter system 10 is shown in cut-away partial section view.

A generally cylindrical disposable waste-receiving container 90 is positioned within housing 12 below opening 18. A deflector 92 is attached to cover 80 and positioned to deflect waste ejected by second rake 51 and guide the waste into an opening 94 of container 90. To this end, a lower deflector portion 96 of deflector 92 is provided which extends at least slightly into opening 94 of container 90.

Figure 3:
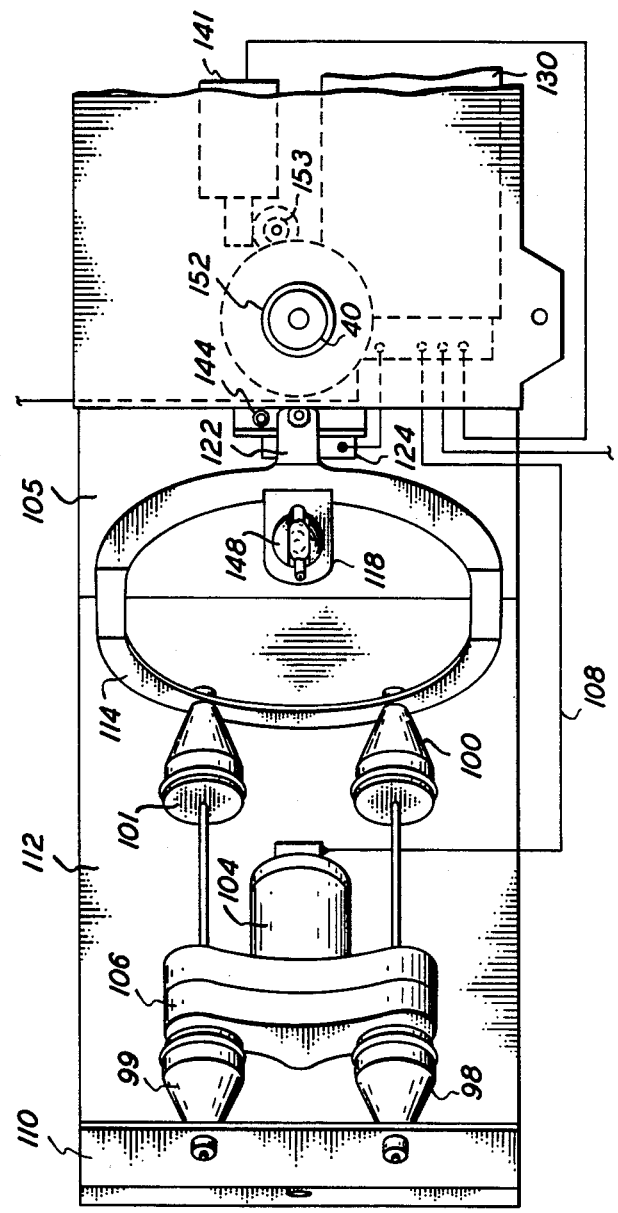
FIG. 3 is a top view of the canister-holding portion of the invention showing the level sensing structure thereof.

Container 90 rests on a supporting cradle 105 including rollers 98 and 100 and a second pair of identical rollers 99 and 101 visible in FIG. 3 forming a four point support for container 90. A motor 104 is coupled through gear box 106 to one or more of rollers 98–101 to provide for rotation of container 90 as will be more fully described in connection with FIG. 3. Preferably, container 90 is rotated at about 40 RPM. Rollers 98–101 and motor 104 are supported on flexible portion 110 of the support cradle. A bottom portion 112 of cradle 105 affixed to the base of litter system 10 and a free portion 114 into which rollers 100 and 101 are journaled is supported on spring 120. An actuating portion 122 of free portion 114 engages a switch 124 that is operative to provide a signal to control means 130 when container 90 becomes sufficiently heavy to indicate a full condition. Preferably, free portion 114 is biased by spring 120 and adjusting nut 121 so that the weight at which a switch 124 is activated maybe set to suit the particular container employed. An indicator, such as lamp 123, visible from outside the system, indicates when the container is full.

The disposal of liquid waste is accomplished through a drain opening 140 in the bottom of chamber 14 which is preferably covered by a screen 142 and leads to a substantially rigid drainage tube 144 that is coupled by a flexible drainage tube 146 to sealing and coupling member 148. Container 90 is preferably provided with a plastic or rubber resilient coupling member 150 adapted for sealing engagement with coupling member 148. Coupling members 148 and 150 are preferably a ball and socket, respectively, for providing a self-aligning watertight seal. When coupled together, a small space is formed therebetween into which the end of tube 146 projects and which also receives the ends of tubes 154, 156 and 158. Tubes 154, 156 and 158 are preferably relatively rigid plastic or glass tubes extending from coupling member 150 into container 90 and spaced approximately 120° apart. Tubes 154, 156 and 158 are oriented so that when container 90 is in its operative position, at least one tube is always inclined downwardly from coupling member 150 so that liquid waste flows therethrough under the force of gravity.

Preferably, container 90 is filled with a quantity of sanitizing and deodorizing mixture 170 that may comprise baking soda or the like. As container 90 is rotated, tubes 154, 156 and 158 aid in the mixing of sanitizing material 170 with the waste, both liquid and solid, present in the container. Preferably, unused containers 90 are precharged with deodorizing and sanitizing material and are sealed such as with a foil cap covering each end thereof to prevent the material contained therein from escaping prior to use. A snap-on cap is preferably provided for sealing container 90 when full.

Control means 130 and a motor 141 are supported by fixed portion 116 of bracket 110. Preferably, control means comprise electronic circuitry as more fully described in connection with FIG. 4 hereof. In operation, input signals are provided from switch 70 and switch 124 to indicate the presence of an animal within chamber 14 and the filling of container 90, respectively. Motor 141 is connected through one or more gears 153 or the like to the lower portion of spindle 40. Preferably, hub 40 includes an intermediate portion 152 passing through and forming a water-tight seal with an opening in the bottom of housing 12 to prevent any waste from draining from chamber 14 except through drain 140. To this end, annular region 160 immediately surrounding the base of hub 40 is inclined away from the hub to enhance drainage. Drain 140 is located at the low point of chamber 14.

The arrangement of cradle 105 for supporting container 90 may be even better seen by referring now to FIG. 3.

Flexible portion 110 has rollers 98 and 99 journaled therein, while rollers 100 and 101 are journaled in free portion 114. Motor 104 is supported and coupled to rollers 98–101 by support and transmission member 106 that may include a plurality of gears for coupling an output shaft of motor 104 to the rollers. Motor 104 is connected to controller 130 by electrical leads 108. Free end portion 114 of cradle 105 includes an opening for receiving container 90 therethrough and includes a downwardly depending portion 118 supporting coupling member 148. Activating portion 122 engages switch 124 as heretofore described to provide an indication when the amount of waste contained within container 90 reaches a predetermined level.

The operation of controller 130 may be more readily understood by referring now to FIG. 4 wherein the circuitry of an exemplary embodiment of a controller in accordance with this invention is illustrated. Controller 130 includes three time-delay subassemblies 200, 210 and 220, each including an input 202, 212 and 222; an output 204, 214 and 224 and a clear input 206, 216 and 226. Additionally, each time delay subassembly is understood to be connected to a source of supply voltage at terminal 240, such connection being omitted from the drawing for clarity. Internally, each time-delay subassembly includes an integrated circuit portion 201, 211 and 221 and associated timing components, namely, resistors 203, 213 and 223 and capacitors 205, 215 and 225. Integrated circuits portions 201, 211 and 221 are preferably CD 4538 dual precision monostable multivibrators or the equivalent implementing the following truth table:

| CLEAR | A | B | Q |
|-------|---|---|---|
| L | X | X | L |
| X | H | X | L |
| X | X | L | L |
| H | L | ⊓̄ | ⎍ |
| H | ⎍ | H | ⎍ | as shown in FIG. 5.

In operation, clear inputs 206, 216 and 226 are connected through the parallel combination of resistor 250 and diode 252 to the supply voltage source. The common point of the three reset inputs is connected through capacitor 260 to the collector of transistor 270. When controller 130 is initially energized, all the time-delay subassemblies are cleared. All outputs are held low by a low signal applied to reset inputs 206, 216 and 226 as a capacitor 260 charges through resistor 250. After a period selected to permit any start up transients to dissipate, each of the time delays is enabled. Preferably the time constant of the combination of capacitor 260 and resistor 250 is selected to provide a suitable initialization period, for example, by a resistor having a value of 10,000 ohms and a capacitor having a value of 0.01 microfarads. After capacitor 260 has charged, the reset inputs are removed and the circuit assumes its quiescent state.

Normally, container full switch 124 is in the position shown in the drawing indicating that the container is not filled. When an animal enters the upper chamber, switch 70 closes, turning on transistor 270. A differentiated pulse is supplied through capacitor 260 to the reset inputs of the multivibrators to debounce switch 70 to provide reliable operation. As long as the animal remains in the upper chamber, switch 70 remains closed and input 202 of multivibrator 201 is held high and output 204 remains low. When the animal leaves the chamber, switch 70 opens and the high-to-low transition at input 202 triggers multivibrator 201 and a pulse is produced at output 204 thereof having a duration determined by the combination of resistor 203 and capacitor 205. Preferably, resistor 203 is selected to have a value of approximately one megohm and capacitor 205 has a value of approximately 47 microfarads, thereby producing a pulse having a duration of approximately 47 seconds.

Output 204 is connected to input 212 of multivibrator 211 which is triggered on the falling edge of the pulse produced by multivibrator 201 to create a second pulse of substantially equal duration that is applied through resistor 300 to the base of transistor 310 that energizes rake motor 141. Motor 141 remains energized for a period determined by the time constant of resistor 213 and capacitor 215, which are preferably selected to provide a time constant as substantially equal to that provided by multivibrator 201. Accordingly, motor 141 is energized for approximately 47 seconds. On the trailing edge of the pulse produced by multivibrator 211, which is also applied to multivibrator 201, multivibrator 221 is triggered and turns on transistor 320 through resistor 322, thereby energizing motor 104. Motor 104 remains on for a period determined by a time constant of resistor 223 and capacitor 225, which is also preferably selected to be about 47 seconds. Thus, rakes 42 and 51 are rotated within chamber 14 for 47 seconds and waste is ejected into container 90. When the initial period has concluded, container 90 is tumbled for 47 seconds to sanitize and deodorize the waste.

If, at any time during the above described cycle, the animal reenters the chamber, switch 70 closes and a clear signal is applied to each of multivibrators 201, 211 and 221, immediately turning off motors 104 and 141 if running, thereby preventing any injury to the animal. The motors remain off as long as the animal is in the chamber and for a preselected period thereafter, at the expiration of which the above described automatic cycle is reinitiated.

When container 90 is filled, switch 124 causes light emitting diode 123 to be lit and deactivates the remainder of control circuit 130 until container 90 is replaced. LED 123 provides a visible indication of the need to replace container 90.

Power for controller 130 is provided by a power supply 350, which is conventional in design and includes a full wave bridge rectifier 360 connected to the output of a transformer 370, the input of which is adapted to be connected to a source of AC voltage by a plug 380. A filter capacitor 390 and a voltage regulator 400 provide a stable DC output voltage for operating controller 130. Preferably, regulator 400 is a 7812 integrated circuit regulator providing an output voltage of 12 volts DC. It is preferred that transformer 370 is the type of transformer that is contained within a housing including plug 380 and which may be plugged directly into a conventional wall outlet from which low voltage connections only are made to the remainder of power supply 350. It will be understood that power supply 350 may be replaced with a battery, and more preferably, a rechargeable battery, thereby eliminating the necessity for a permanent connection to an external power source.

While the invention has been described in connection with a presently preferred embodiment thereof, it will be appreciated by those skilled in the art that certain modifications and changes may be made without departing from the true spirit and scope of the invention, which is intended to be defined solely by the appended claims.

What is claimed is:

1. A litter system comprising:
   a chamber adapted to contain a quantity of particulate litter;
   a rake disposed within said chamber;
   a means for moving said rake through said chamber;
   a container for receiving waste;
   a means for directing waste away from said chamber to said container; and
   means for rotating said container to tumble the contents thereof.

2. The litter system of claim 1 comprising a substantially round chamber.

3. The litter system of claim 2 wherein said rake is attached to a substantially centrally disposed hub adapted to rotate within said chamber.

4. The litter system of claim 3, wherein said chamber comprises an outer peripheral wall having an opening therein.

5. The litter system of claim 4 comprising a passageway coupling said chamber with said container.

6. A portable litter system comprising:
   a chamber adapted to contain a quantity of particulate litter and having means for sensing the presence of an animal within the chamber;
   a rake disposed with said chamber, the rake having a plurality of spaced apart elements adapted to pass through the particulate litter and sweep waste therefrom towards an outer periphery of the chamber;
   electric means for moving said rake through said chamber;
   a container;
   means for connecting said chamber to said container such that the container receives waste swept from the chamber; and
   control means connected to said electric rake-moving means and said means for detecting the presence of an animal within said chamber for energizing said rake-moving means only after said animal has left said chamber.

7. The litter system of claim 6 wherein said control means further comprises means for energizing said rake-moving means for a predetermined period.

8. The litter system of claim 7 further comprising means for rotating said container to tumble the contents thereof.

9. The litter system of claim 8 wherein said control means comprises said means for energizing said container rotating means subsequent to the deenergization of said rake rotating means and for deenergizing said container rotating means after a predetermined period of time.

* * * * *